No. 879,700. PATENTED FEB. 18, 1908.
W. V. TURNER.
GRADUATED RELEASE VALVE.
APPLICATION FILED JUNE 27, 1906.

WITNESSES

INVENTOR
Walter V. Turner
by E. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

GRADUATED-RELEASE VALVE.

No. 879,700.  Specification of Letters Patent.  Patented Feb. 18, 1908.

Application filed June 27, 1906. Serial No. 323,610.

*To all whom it may concern:*

Be it known that I, WALTER V. TURNER, a citizen of the United States, residing at Edgewood, in the county of Allegheny and State of Pennsylvania, have invented certain new and useful Improvements in Graduated-Release Valves, of which the following is a specification.

My invention relates to improvements in automatic fluid pressure brakes for railway cars; and it consists in new and improved means for controlling the exhaust of fluid from the brake cylinder for the purpose of effecting a graduated, or partial, release of the brakes.

Figure 1:
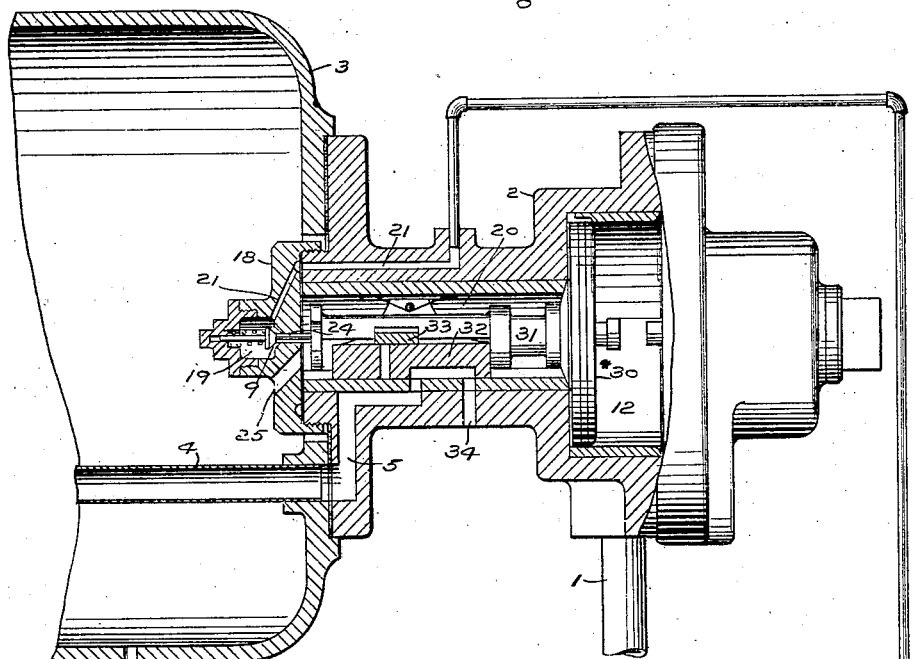
Figure 2:
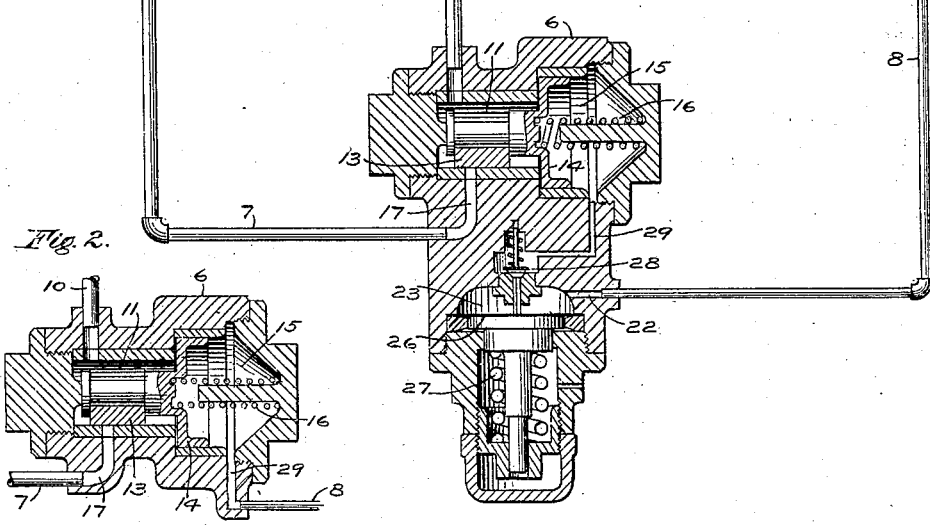

In the accompanying drawing, Figure 1 is a sectional view showing one form of my improvement; and Fig. 2 illustrates a slight modification.

The apparatus as shown in Fig. 1 comprises a triple valve device, 2, an auxiliary reservoir, 3, and a brake cylinder pipe, 4; arranged as in a common form of freight brake apparatus. In addition thereto, and in combination therewith, my invention provides a separate valve device for charging the auxiliary reservoir, and means operative by movement of the triple valve piston for controlling the reservoir charging device.

The reservoir charging device comprises a main slide valve, 13, which is located in a chamber, 11, in the casing 6, and which is connected to and operated by movement of the piston, 14, in the chamber 15. A spring, 16, bears against the piston 14, and tends to move it to the left and to hold it in the position shown in the drawing.

The chamber 11 is normally charged with fluid under pressure through a supply pipe, 10, which may lead from any additional source of supply of fluid under pressure; such as a supplemental reservoir, a main reservoir, a main reservoir pipe line, or a control pipe line; and the valve 13 controls a passage, 17, which is in communication with the interior of the auxiliary reservoir through a pipe 7.

A screw cap, 18, on the inner end of the triple valve casing, is provided with a chamber 19 containing a spring pressed puppet valve, 9, which controls communication between the triple valve chamber, 20, and the passage 21, and which is adapted to be unseated by the stem of the triple valve piston when the piston is in position to release the brakes. The passage 21 communicates through a pipe, 8, and a passage, 22, with a diaphragm chamber, 23, in the casing 6; and when the puppet valve 9 is unseated the diaphragm chamber, 23, is in open communication with the interior of the auxiliary reservoir through the passage 22, pipe 8, passage 21, chamber 19, valve controlled passage 24, chamber 20 of the triple valve, and passage 25, in the screw cap 18.

The diaphragm, 26, closes the chamber 23 to the atmosphere, and is subject to the pressure of a spring, 27, which tends to move the diaphragm to its upper position against the fluid pressure in the diaphragm chamber. A puppet valve, 28, controls communication between the chamber, 23, and a passage, 29, leading to the chamber 15; and this puppet valve is adapted to be unseated by the upward movement of the diaphragm when the fluid pressure in the chamber 23 is not sufficiently great to overcome the pressure of the spring 27. The spring 27 is so adjusted as to yield to the normal degree of pressure, about 70 pounds, in the chamber 23, and the downward movement of the diaphragm permits the seating of the spring pressed puppet valve 28.

As shown in the drawing, the piston, 30, and valves of the triple valve device, are in position to release the brakes; the puppet valve 9 is unseated by the stem of the triple valve piston, and the diaphragm chamber, 23, is in open communication with the auxiliary reservoir through the passages already described; the puppet valve 28 is seated; and the slide valve 13 closes communication between the supply pipe 10 and the interior of the auxiliary reservoir.

The slide valve 13 is held in its closed position by the pressure of the spring 16 and the pressure of the fluid in chamber 15, which fluid passes around the piston 14 from the chamber 11, and is held in chamber 15 by the closure of the puppet valve 28.

When the brakes are applied, by a reduction of pressure in the train pipe 1, the piston 30, stem 31, main valve 32, and graduating valve 33 are moved to the right so as to cut off the brake cylinder passage 5 from the exhaust passage 34, and to open communication between the auxiliary reservoir and brake cylinder. The movement of the piston stem 31 to the right permits the puppet valve 9 to be seated by the spring 19, and this closure of the valve 9 retains the normal reservoir pressure in the diaphragm chamber 23.

When it is desired to effect a graduated or partial, release of the brakes, a slight increase of train pipe pressure will move the piston 30 to release position; the puppet valve 9 will be unseated; fluid under pressure will flow from the diaphragm chamber 23 to the auxiliary reservoir, thereby reducing the pressure on the diaphragm 26 and allowing the spring 27 to move the diaphragm upward so as to unseat the puppet valve 28. When the puppet valve 28 is unseated, the fluid under pressure in the chamber 15 is also released to the auxiliary reservoir; the fluid pressure in chamber 11 then moves the piston 14 and valve 13 to the right so as to open passage 17 and to permit fluid under pressure from the supply pipe 10 to flow to the auxiliary reservoir. When the pressure in the auxiliary reservoir is increased sufficiently to overcome the slightly increased pressure in the train pipe the piston 30 will move to the right so as to cut off the exhaust from the brake cylinder and to permit the closing of puppet valve 9; pressure from chamber 11 will accumulate in chamber 15, and this pressure together with the pressure of the spring 16 will move piston 14 and valve 13 to the left so as to close the port or passage 17 and cut off the flow of fluid from supply pipe 10 to the auxiliary reservoir. The pressure in chamber 15 will equalize with that in diaphragm chamber 23 and the puppet valve 28 will be seated. The train pipe pressure may be again slightly increased so as to move the piston 30 to release position to unseat the valve 9 and to connect exhaust port 34 with the brake cylinder port 5, and thereby effect a partial release of the brakes, which is checked by an increase in auxiliary reservoir pressure effected as already described. This operation may be repeated as often as desired, or necessary.

The fluid supplied through the pipe 10 is preferably under a higher pressure than that which normally exists in the auxiliary reservoir and train pipe; and the form of my invention shown in the drawing is specially adapted for use where the supply of fluid, for increasing auxiliary reservoir pressure, is under a greater pressure than that normally existing in the train pipe and auxiliary reservoir; but it is not limited to such use, and if necessary, or preferred, the normal pressure of the brake system, usually about 70 pounds, may be employed in the supply pipe 10. In the latter instance the auxiliary diaphragm device comprising the diaphragm 26, spring 27, and valve 28, may be dispensed with, and the pipe 8 may then be connected with the chamber 15 either directly or through the passage 29, as illustrated in Fig. 2 of the drawing.

It will be noted that this construction provides means for rapidly recharging the auxiliary reservoir upon release of the brakes, as the valve 9 is open in full release position, and the reservoir charging device operates to recharge the auxiliary reservoir together with the usual feed through the feed groove around the triple valve piston.

Having now described my invention, what I claim as new and desire to secure by Letters Patent, is:—

1. In an automatic fluid pressure brake system, the combination, with a triple valve, an auxiliary reservoir, and a brake cylinder, of means, for effecting a partial, or graduated, release of the brakes, comprising a reservoir charging valve device, and a valve device operative by movement of the triple valve piston for controlling the reservoir charging device.

2. In an automatic fluid pressure brake system, the combination, with an auxiliary reservoir, a train pipe, and a brake cylinder, of a reservoir charging valve device, and a valve device operative by movement of the triple valve piston for varying the pressure in the reservoir charging device and thereby effecting an increase of pressure in the auxiliary reservoir so as to cut off the release from the brake cylinder.

3. In an automatic fluid pressure brake system, the combination, with a triple valve, an auxiliary reservoir and a brake cylinder, of a device independent of the main valve of the triple valve for charging the auxiliary reservoir, and a valve operative by the stem of the triple valve piston for controlling the reservoir charging device and thereby effecting an increase of auxiliary reservoir pressure by which the exhaust from the brake cylinder is cut off.

4. In an automatic fluid pressure brake system, the combination, with an auxiliary reservoir, a brake cylinder, and a triple valve device, of means, for effecting a partial, or graduated, release of the brakes, comprising a valve device for increasing pressure in the auxiliary reservoir, a movable abutment and valve auxiliary thereto, and a valve operative by movement of the triple valve piston for controlling pressure on the movable abutment and thereby controlling the operation of the reservoir charging device.

5. In an automatic fluid pressure brake system, the combination, with an auxiliary reservoir brake cylinder and triple valve, of an auxiliary reservoir charging device, and a valve device for effecting operation of the charging device by releasing fluid under pressure therefrom to the auxiliary reservoir when the triple valve is in full release position.

6. In an automatic fluid pressure brake system, the combination, with an auxiliary reservoir, a brake cylinder, and a triple valve device, of an auxiliary reservoir charging device, and a valve operative by movement of the triple valve piston for effecting operation of the charging device by releasing fluid under pressure therefrom to the auxiliary reservoir.

7. In an automatic fluid pressure brake system, the combination, with an auxiliary reservoir, brake cylinder, and triple valve, of means, for effecting a partial, or graduated, release of the brakes, comprising valve mechanism separate from the main valve of the triple valve device, and having connections with the auxiliary reservoir and a source of supply for increasing the auxiliary reservoir pressure, and a connection with the auxiliary reservoir, through which the supply of fluid to the auxiliary reservoir, for graduating the release of the brakes, is controlled.

8. In a fluid pressure brake, the combination with a triple valve, auxiliary reservoir, and brake cylinder, of means for effecting a graduated or partial release of the brakes, comprising a supplemental reservoir and a valve device governed by auxiliary reservoir pressure for supplying fluid to the auxiliary reservoir.

In testimony whereof I have hereunto set my hand.

WALTER V. TURNER.

Witnesses:
R. F. EMERY,
J. B. MACDONALD.